(12) United States Patent
Blaine et al.

(10) Patent No.: US 10,867,093 B1
(45) Date of Patent: Dec. 15, 2020

(54) SYSTEM AND METHOD FOR AN ELECTRONIC DESIGN TOOL PROVIDING AUTOMATED GUIDANCE AND INTERFACE FOR CIRCUIT DESIGN PROCESSING

(71) Applicant: Xilinx, Inc., San Jose, CA (US)

(72) Inventors: John Blaine, Weybridge (GB); Srinivasan Dasasathyan, Secunderabad (IN); Meghraj Kalase, Hyderabad (IN); Frederic Revenu, San Carlos, CA (US); Veeresh Pratap Singh, Hyderabad (IN); Satish Bachina, Hyderabad (IN); Shail Bains, Hyderabad (IN); Padmini Gopalakrishnan, Hyderabad (IN); Sumit Nagpal, Hyderabad (IN); Gaurav Dutt Sharma, Benares (IN)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/359,800

(22) Filed: Mar. 20, 2019

(51) Int. Cl.
*G06F 17/50* (2006.01)
*G06F 30/3323* (2020.01)
*G06F 30/30* (2020.01)
*G06F 30/10* (2020.01)
*G06F 30/20* (2020.01)
*G06F 30/00* (2020.01)

(52) U.S. Cl.
CPC .......... *G06F 30/3323* (2020.01); *G06F 30/30* (2020.01); *G06F 30/00* (2020.01); *G06F 30/10* (2020.01); *G06F 30/20* (2020.01)

(58) Field of Classification Search
CPC ...... G06F 30/3323; G06F 30/30; G06F 30/20; G06F 30/10; G06F 30/00
See application file for complete search history.

(56) References Cited

U.S. PATENT DOCUMENTS

| | | | | |
|---|---|---|---|---|
| 8,807,948 | B2 * | 8/2014 | Luo | G06F 30/398 |
| | | | | 416/136 |
| 8,984,462 | B1 | 3/2015 | Das | |
| 9,529,952 | B1 * | 12/2016 | Gamsa | G06F 30/33 |
| 10,282,508 | B1 * | 5/2019 | Le | G06F 30/3312 |
| 2004/0103380 | A1 * | 5/2004 | Bohl | G06F 30/00 |
| | | | | 716/136 |

* cited by examiner

*Primary Examiner* — Nghia M Doan
(74) *Attorney, Agent, or Firm* — Crawford Maunu PLLC (57) ABSTRACT

Disclosed approaches for guiding actions in processing a circuit design include a design tool identifying first violations of design checks and determining severity levels of the first violations. The design tool determines for each violation, suggested actions associated with the violation and presents on a display, first data indicative of the suggested actions in order of the severity levels of the first violations. The first data include selectable objects, and each selectable object has an associated executable procedure. The design tool can execute the procedure associated with one of the selectable objects in response to selection and modify the circuit design in response to execution of the procedure.

19 Claims, 6 Drawing Sheets

| Suggestions | Descriptions | Next Steps | Explanation |
|---|---|---|---|
| CLOCK-5 | Rebalance source and destination clock paths | Fix the design to balance source and destination clock path delays | The source and destination clock path delays are unbalanced resulting in high clock skew. |
| CLOCK-12 | Register to BUFGCE paths | run "source RQSImplCommon.tcl" | Paths from register to BUFGCE have high clock skew |

FIG. 6 suggestion engine

502 Sort violations of design checks by severity level

↓

504 For each violation object of a base check having a severity level greater than a threshold, determine the violation objects having dependent checks of the base check

↓

506 Output in order of descending levels of severity of base checks, the suggested actions associated with the base checks and dependent checks

↓

508 Execute automated procedure in response to selection of suggested action

SYSTEM AND METHOD FOR AN ELECTRONIC DESIGN TOOL PROVIDING AUTOMATED GUIDANCE AND INTERFACE FOR CIRCUIT DESIGN PROCESSING

TECHNICAL FIELD

The disclosure generally relates to processing of circuit designs.

BACKGROUND

Achieving timing closure to implement a circuit design can involve significant effort and multiple iterations of a design flow. Timing closure can be especially challenging for circuit designs that push performance requirements and device resource utilization.

Finding and fixing the sources of timing problems in a circuit design adds to the challenges of reaching timing closure. A designer may have to analyze detailed and lengthy log files produced by electronic design automation (EDA) tools to understand optimization challenges presented by the circuit design. Once a problematic portion of the circuit design is identified, the circuit designer must then find and create a design alternative that eliminates or reduces the impact of the problem. For experts, the process is time consuming. For novice users, finding the source of and solution to a problem can be impractical. For some problems, assistance from an application engineer who is an expert with the EDA tools and target device may be required. Difficulties may be further amplified with tools that hide the complexity of register transfer language (RTL) in order to enable software designers, who may be unfamiliar with RTL and timing closure issues, to create circuit designs.

SUMMARY

A disclosed method includes Identifying first violations of design checks in a circuit design by a design tool executing on a computer and determining severity levels of the first violations by the design tool. The method further includes determining for each violation of the first violations, one or more suggested actions associated with the violation by the design tool and presenting on a display, first data indicative of the suggested actions in order of the severity levels of the first violations. The first data include one or more first selectable objects, and each first selectable object has an associated executable procedure. The design tool in performing the method executes the procedure associated with one of the first selectable objects in response to selection of the one of the first selectable objects and modifies the circuit design in response to the executing of the procedure associated with the one of the first selectable objects.

A disclosed system includes a processor and a memory arrangement. The memory arrangement is configured with instructions and in response to execution of the instructions, the processor performs operations including identifying first violations of design checks in a circuit design and determining severity levels of the first violations. The operations further include determining for each violation of the first violations, one or more suggested actions associated with the violation and presenting on a display, first data indicative of the suggested actions in order of the severity levels of the first violations. The first data include one or more first selectable objects, and each first selectable object has an associated executable procedure. The operations further include executing the procedure associated with one of the first selectable objects in response to selection of the one of the first selectable objects and modifying (the circuit design in response to the executing of the procedure associated with the one of the first selectable objects.

Other features will be recognized from consideration of the Detailed Description and Claims, which follow.

BRIEF DESCRIPTION OF THE DRAWINGS

Various aspects and features of the methods and system will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed methods and systems provide improved approaches for EDA tools to guide designers in achieving timing closure on a circuit design. The EDA tools may be referred to as a design tool for ease of reference. The methods and systems provide rapid identification of problematic portions or aspects of a circuit design. Problematic aspects of the circuit design can be prioritized in order to lead the designer to a solution that is most likely to resolve the problem. In addition, the design tool provides convenient access to initiation of automated procedures for fixing identified problematic aspects.

The disclosed methods and systems generally follow a process of assessment, suggestion, and resolution. An automated framework is provided to make design closure problems easier to solve. The design tool assesses the design and provides suggested actions to help resolve timing closure problems, routability problems and power constraints.

The design tool can assess the circuit design following design flow stages of synthesis, optimization, placement, and routing. The assessment indicates to the designer the likelihood that the design tool can successfully complete routing the circuit design and satisfy timing and/or power constraints. The circuit design can be assessed by identifying design checks that are violated by the circuit design and determining severity levels of the violations. In one approach, the severity level is indicative of the likelihood that the design tool can successfully complete routing the circuit design and satisfy timing and/or power constraints. Lesser severity levels can indicate a higher likelihood of success, and greater severity levels can indicate a lower likelihood of success.

Once violations have been identified and severity levels determined, the design tool can present suggested actions to resolve the issues. Each violation can have one or more suggested actions. Also, some suggested actions can be associated with more than one violation. The design tool can present the suggested actions to a designer by outputting to a display, descriptions of steps that can be taken to modify the circuit design and resolve the violations. The suggested actions can be presented in order of the most-to-least severe level of violation. A suggested action can be associated with a manual or an automated procedure. A manual procedure can be indicated by text that describes actions the designer should take to resolve the violation.

An automated procedure can be associated with an object of descriptive text on a display and initiated by way of user selection of the object. In an exemplary implementation, automated procedures can be implemented as tool command language (Tcl) scripts that direct the design tool to make targeted changes to optimizations or design constraints. The optimizations can be targeted to specific nets, instances, modules of the circuit design, or software algorithms. The optimizations can redirect an earlier stage of the design flow based on more accurate information of timing or congestion obtained later in the design flow. Alternative implementations can employ other languages and/or control mechanisms.

Figure 1:
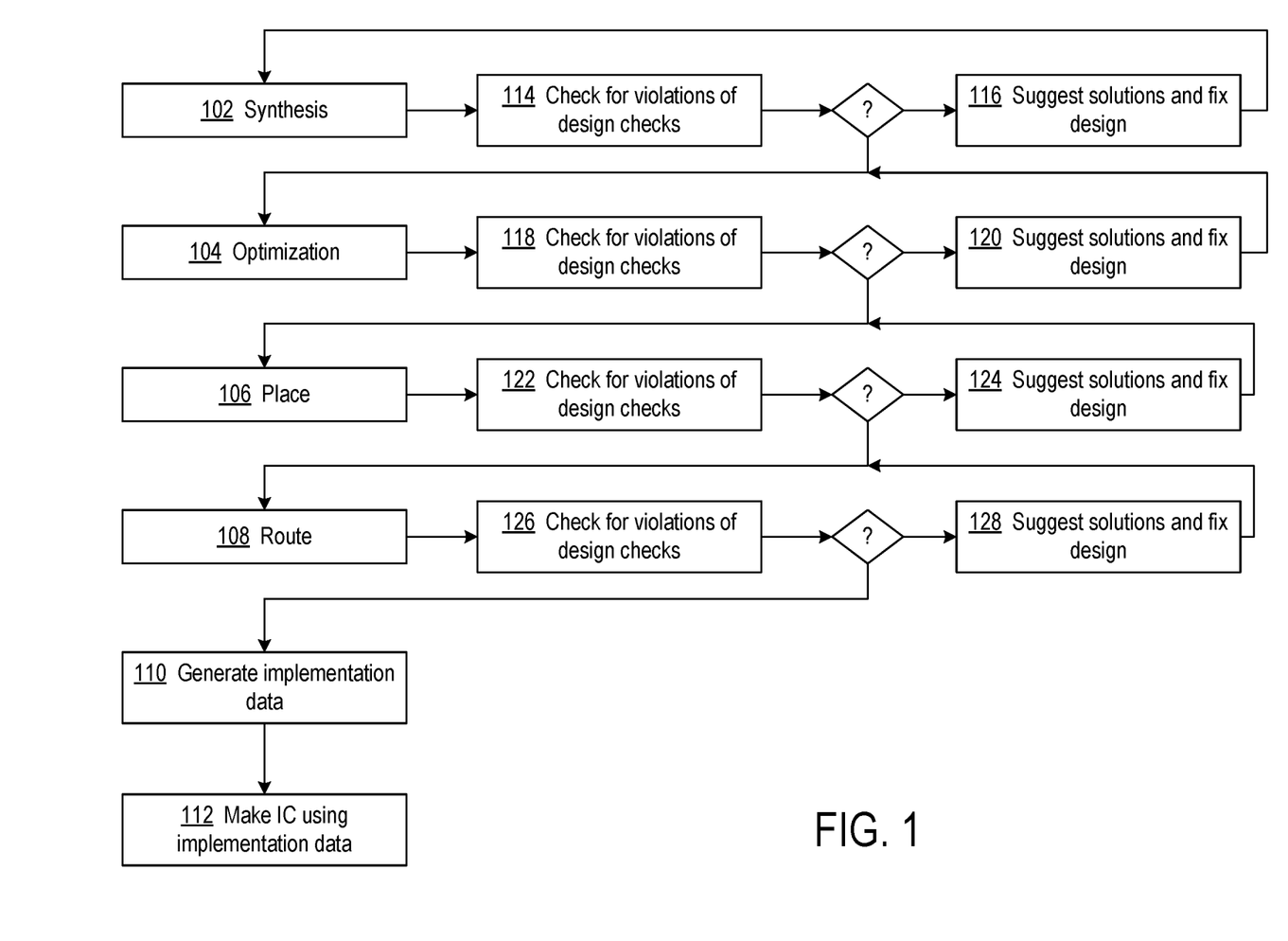
FIG. 1 is a flowchart of an exemplary process of processing a circuit design.

FIG. 1 is a flowchart of an exemplary process of processing a circuit design. The phases of the design flow are shown as blocks 102, 104, 106, 108 and 110. After each of the phases of the design flow and before proceeding to the next phase, the design tool checks for violations of design checks. If the violations are too serious to proceed to the next phase, the design tool presents suggested actions to fix the violations. Otherwise, the design tool can automatically proceed, without user initiation, to the next phase of the design flow.

At block 102, the design tool performs logical synthesis of the circuit design. The synthesis phase includes translation of an RTL specification into a netlist. Optionally, the synthesis can also include high-level synthesis of high-level language source code into RTL code. Following logical synthesis, at block 114, the design tool checks for violations of design checks that can be evaluated post-synthesis. A design check is an aspect or characteristic exhibited by the circuit design that could contribute to timing failure, cause routability problems by increasing congestion, and/or violate power constraints. In most instances, the presence in the circuit design of an aspect or characteristic specified by a design check indicates a violation of the design check.

The design checks can be categorized into classes, such as utilization, timing, design constraints, congestion and clocking. The classes can also include design checks for power consumption and runtime. The design checks can be characterized by the stage of design flow at which information is available for detecting violations. Each design check can also have an associated value that indicates the level of severity of one design check to other design checks.

One example of a utilization check is utilization of a selected cell type in a certain region of a target device. If the utilization level exceeds a threshold level, the design check is violated. Another example of a utilization check is the number of control sets (combination of set, reset, enable, and clock signals) in the circuit design. If the number of control sets exceeds a threshold value, the design check is violated. The severity level of the violation can be based on the amount by which the threshold is exceeded.

An example of a timing check is the worst negative slack (WNS) of the circuit design. The violation of a WNS check can be determined based on a threshold value. Different design flow stages can have different threshold values, and the severity of the violation can be based on the amount by which the WNS exceeds the threshold. Another example of a timing check is the presence of macros in critical paths. A violation can be determined by the presence of a macro in a critical path, and the severity of the violation can be based on the number of macros in the N most critical paths.

An example of a design constraint design check is the number of logic levels in the circuit design. For example, a device can have approximately 400 ps of delay for each logic level. For a timing constraint of 1.5 ns, a violation can be raised for a path spanning 5 logic levels, because 5 logic levels*400 ps/logic level=2 ns. Since the best case scenario is 5*400=2 ns.

An example of a congestion design check is the level of fanout of a net that drives control pins in a particular congestion region. A violation can be determined based on a first threshold value for identifying high-fanout nets and a second threshold value indicating a number of high-fanout nets in the region. The severity level of the violation can be determined based on the number of high-fanout nets in the region. Another example of a congestion design check, which is specific to field programmable gate arrays (FPGAs) is the level of utilization of look-up table (LUT) RAMs (LUTRAMs) in a region of a target device. A violation can be detected based on the number of LUTRAMs in the region relative to a threshold value, and the severity of a violation can be determined based on the difference between the number of LUTRAMs and the threshold value.

An example of a clocking design check is a sub-optimal clock delay group. A clock delay group includes source and destination pins connected to a common clock node. The violation of a clock delay group design check can be detected by the placement of the common node being sub-optimal. A sub-optimal clock delay group is detected in a design having critical paths that span two related clock domains, and the paths do not have the same common node in terms of placement. Each critical path emanates from a different clock region.

The severity level of the violation can be based on the number of paths having sub-optimal clock delay group. Another example of a clocking design check, which is specific to FPGAs, is the presence of a look-up table (LUT) in a clock path. The violation of the design check can be determined based on the presence of a LUT in a clock path, and the severity of the violation can be based on the number of clock paths having LUTs.

Returning now to block 114, the design tool checks for violations of design checks following synthesis of the circuit design. If a violation is detected, the design tool can determine a severity level of the violation. The design tool determines the level of severity for each violation and determines an overall satisfaction level for the design based on the severity levels of the violations. The satisfaction level indicates the likelihood that the design tool can successfully route, satisfy timing constraints, and/or satisfy power constraints. In one implementation, the satisfaction level is indicated by a score ranging from 1 to 5. A score of 1 indicates that the design tool will not successfully route, satisfy timing constraints, and/or satisfy power constraints, and score of 5 indicates that the design tool will easily route, satisfy timing constraints, and/or satisfy power constraints. Scores within the range of 2 to 4 indicate the degree of difficulty or degree of designer effort involved in modifying the circuit design to route and/or satisfy the constraints. Alternative approaches for indicating severity levels of violations and a level of satisfaction of the circuit design could be employed to achieve comparable results.

In response to the satisfaction level being less than a threshold level, the design tool proceeds to block 116 and presents suggested actions associated with the design checks found to have been violated. The display tool can output the suggested actions to a display, and the suggested actions can be presented in order of the severity levels (most severe to least severe) of the violations with which the suggested actions are associated.

A suggested action can be presented in the form a user-selectable display object that has an associated executable procedure. The object can be selected by a point-and-click device, keyboard, voice activation, or touchscreen activation, for example. In response to selection of the object, the design tool initiates execution of the associated executable procedure. For example, the suggested action associated with the violation of the design check involving the presence of a LUT in a clock path, can be a selectable object that suggests, "Move a gated clock to enable logic." The associated executable procedure can specify an option for the synthesis phase to convert gated clock signals. The design tool can rerun synthesis at block 102 with the specified option. In response to the specified option, the design tool modifies the circuit design to bypass the LUT and connect the clock signal to the clock pins of sequential primitives (e.g., flip-flops, block RAMs, or digital signal processing circuits DSPs) that the gated clock signal was driving, along with connecting the associated enable signal to the enable pins of the sequential primitives.

In response to the satisfaction level determined after block 114 being greater than the satisfaction threshold level, the design tool can proceed to block 104 and perform optimization processing on the circuit design. After optimization processing, at block 118 the design tool checks for violations of post-optimization design checks. Post-optimization design checks can relate to timing and placement constraints specified for the circuit design. A violation of a timing or placement constraint is a violation of the corresponding design check. The design tool determines a satisfaction level based on the violations of the design checks, and in response to the satisfaction level being less than a satisfaction threshold level, the design tool proceeds to block 120. At block 120, the design tool presents suggested actions associated with the violated design checks. The suggested actions can be manual suggested actions or automated suggested actions as described above. The manual or automated suggested actions can change the timing or placement constraints of the circuit design to resolve the violation of the design check, and the design tool can rerun the optimization phase at block 104.

Once the satisfaction level of the circuit design exceeds the satisfaction threshold level, the design tool can perform the placement phase at block 106. After performing placement, at block 122 the design tool checks for violations of design checks. An example of a post-placement design check is the utilization of LUTRAMS in a region of an FPGA as described above. Based on detected violations, the design tool determines the satisfaction level of the circuit design. In response to the satisfaction level being less than the satisfaction threshold level, the design tool proceeds to block 124 and presents manual and automated suggested actions as described above. To resolve the aforementioned violation, the design tool can rerun the placement phase at block 106 while restricting the number of LUTRAMs instantiated in any given area of the target device.

Once the satisfaction level of the circuit design exceeds the satisfaction threshold level, the design tool can perform the routing phase at block 108. After performing routing, at block 126 the design tool checks for violations of design checks. An example of a post-routing design check is the timing check as described above. Based on detected violations, the design tool determines the satisfaction level of the circuit design. In response to the satisfaction level being less than the satisfaction threshold level, the design tool proceeds to block 128 and presents manual and automated suggested actions as described above. An exemplary manual suggested action explains that a timing delay violation may be caused by output from a block RAM not being pipelined. The suggested action can instruct the designer to add sufficient pipelining to reduce the delay. An exemplary automated suggested action identifies a high fanout net in a critical path and the design tool can automatically tag the high fanout net with a property that causes design tool to replicate the net in an optimization phase of the design flow.

Once the satisfaction level of the circuit design exceeds the satisfaction threshold level, the design tool can proceed to block 110 and generate implementation data. For example, bitstream generation procedures can be executed to generate configuration data for an FPGA. Other tools can generate implementation data from which an application-specific (ASIC) can be fabricated. At block 112, an integrated circuit (IC) can be made by way of configuring a programmable IC with the configuration bitstream or fabricating, making, or producing an ASIC from the implementation data, thereby creating a circuit that operates according to the resulting circuit design.

Figure 2:
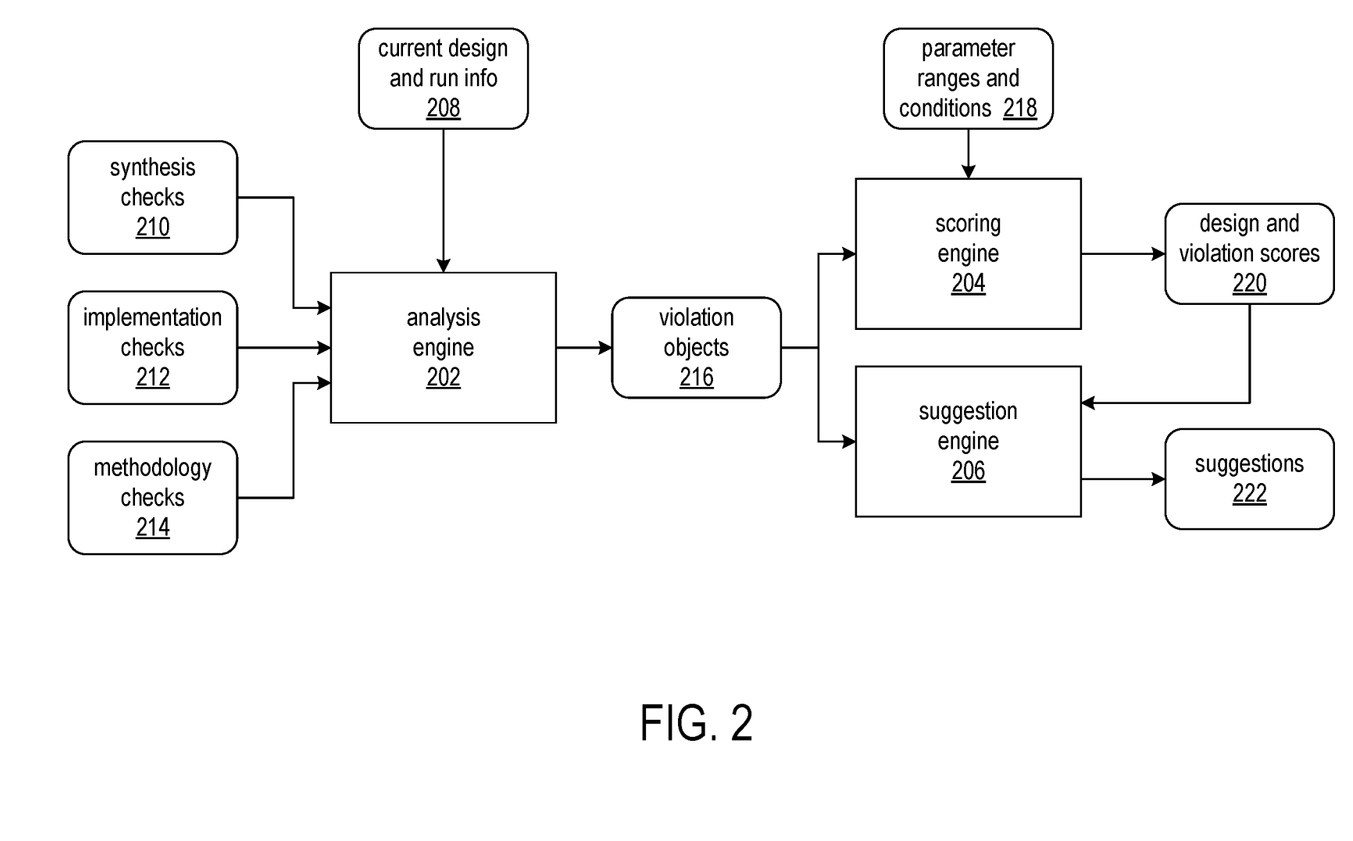
FIG. 2 shows components of a design tool for assessing a circuit design for violations of design checks, and presenting suggestion actions for resolving detected violations.

FIG. 2 shows components of a design tool for assessing a circuit design for violations of design checks, and presenting suggested actions for resolving detected violations. The analysis engine 202, the scoring engine 204, and the suggested action engine 206 are components of the design tool that can implement algorithms that perform the assessment and presentation of suggested actions. The synthesis checks 210, implementation checks 212, and methodology checks 214 are data files that specify the design checks against which the current state of the circuit design and run information 208 is to be evaluated. The analysis engine generates violation objects 216 that describe the detected violations of the design checks along with associated suggested actions. The scoring engine 204 uses data in the parameter ranges and conditions 218 to generate a design score, which indicates a satisfaction level of the design, and individual violation scores 220, which indicate severity levels of the violations. Based on the violation objects and the design and violation scores, the suggested action engine 206 outputs the suggested actions 222.

The synthesis checks 210, implementation checks 212, and methodology checks 214 specify patterns that are used by the analysis engine 202 to detect violations. Each design check can have an associated initial score that indicates the severity of a violation of that design check.

The analysis engine 202 inputs the synthesis checks 210, implementation checks 212, and methodology checks 214 and counts occurrences of the pattern in selected paths or regions of the current design and run info 208. The selected paths can be those identified as critical by way of static timing analysis. Selected regions can be identified by storing data during the placement and routing phase indicating the portions of the design that were difficult to place and route. The analysis engine 202 generates violation objects 216 from the detected violations. Each violation object 216 stores information that identifies the relevant path or regions, information that describes the violated design check, information that indicates the severity (e.g., a score) of the violation, and information that indicates one or more suggested actions for resolving the violation.

The scoring engine 204 inputs the violation objects 216. For each violation object 216, the scoring engine 204 determines the severity level of the violation and assigns a corresponding score. An aggregator function of the scoring engine 204 determines a satisfaction level for the entire circuit design based on the categories of design checks and scores of detected violations. As described above the categories of design checks include utilization, timing, design constraints, congestion and clocking. The aggregator function determines an overall score for each category based on the violations of the design checks in that category.

The severity level of a violation of a design check can vary by the phase of the design flow in which the violation was detected. For example, a setup slack of 300 ps may have a medium severity level after placement, but a high severity level after routing. The different severity levels and conditions for detecting violations are specified in the parameter ranges and conditions data 218. The parameter ranges and conditions can be specified in an extensible markup language (XML) file in order to make the scoring mechanism data-driven and easy to update.

Table 1 shows an example of different parameter ranges and scores associated with violations of design checks involving utilization of resources within an area of a programmable integrated circuit (IC). The example involves a programmable IC having FPGA circuit resources ("Primitive") including LUTs, flip-flops ("SLICEFF"), digital signal processors ("DSPs"), and RAM resources ("RAMBTILE") within an area termed a super logic region (SLR). Each primitive has an associated threshold value for detecting a violation. For example, if more than 90% of the LUTs in an SLR are consumed by the circuit design, the LUT utilization design check is violated.

TABLE 1

| Primitive | Threshold | Score 2 | Score 1 |
|---|---|---|---|
| LUT | 90% | 90 -> 95 | 95 -> 1000 |
| SLICEFF | 70% | 70 -> 75 | 75 -> 1000 |
| DSP | 80% | 80 -> 95 | 95 -> 1000 |
| RAMBTILE | 80% | 80 -> 95 | 95 -> 1000 |

A utilization violation can have a different level of severity depending on the amount by which the utilization exceeds the threshold. For example, if the number of LUTs used by the circuit design in an SLR is between 90% and 95%, the severity level of the violation is indicated by a score of 2, and if the number of LUTs used by the circuit design in an SLR is between 95% and 100%, the severity level of the violation is indicated by a score of 1. A lower score indicates a more severe violation.

Table 2 shows an example of a design check having different thresholds for detecting violations in different phases of the design flow as well as different scores in different phases. The example design check is the worst negative setup slack. Each phase of the design flow has an associated threshold value for detecting a violation. The synthesis and optimization phases both have threshold values of −0.250 ns, the placement and physical optimization phases both have threshold values of −0.300 ns, and the routing phase has a threshold value of −0.100 ns.

TABLE 2

| Phase | Threshold | Score 4 | Score 3 | Score 2 |
|---|---|---|---|---|
| synthesis | −0.250 ns | −0.250 -> −0.500 | −0.500 -> −1.0 | −1.0 -> −100 |
| optimization | −0.250 ns | −0.250 -> −0.500 | −0.500 -> −1.0 | −1.0 -> −100 |
| placement | −0.300 ns | −0.300 -> −0.750 | −0.750 -> −2.5 | −2.5 -> −100 |
| physical optimization | −0.300 ns | −0.300 -> −0.500 | −0.500 -> −1.5 | −1.5 -> −100 |
| routing | −0.100 | −0.100 -> −0.500 | −0.500 -> −1.0 | −1.0 -> −100 |

Within each phase, a violation of the setup WNS design check can have a different level of severity depending on the amount by which the WNS exceeds the threshold WNS associated with that phase. For example, in the optimization phase, if the WNS is between −0.250 ns and −0.500 ns, the severity level of the violation is indicated by a score of 4; if the WNS is between −0.500 ns and −1.0 ns, the severity level of the violation is indicated by a score of 3; and if the WNS is between −1.0 ns and −100.0 ns, the severity level of the violation is indicated by a score of 2.

The suggestion engine 206 inputs the violation objects 216 and the design and violation scores 220. The suggestion engine 206 sorts the violation objects in order of most-severe to least-severe based on the violation scores. The suggestion engine 206 obtains the suggested actions specified in the violation objects and outputs the suggested actions 222 in the order of severity levels of the violations with which the suggested actions are associated. The suggested actions 222 can be output to an interactive display for review and action by a designer.

Figure 3:
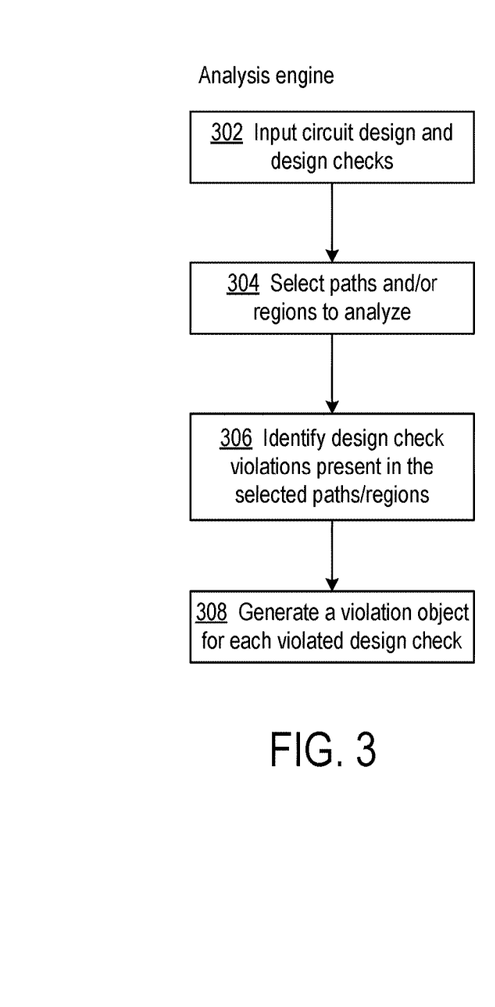
FIG. 3 shows a flowchart of the process performed by the analysis engine in assessing a circuit design for violations of design checks.

FIG. 3 shows a flowchart of the process performed by the analysis engine 202 (FIG. 2) in assessing a circuit design for violations of design checks. At block 302, the analysis engine inputs the circuit design and run information associated with the circuit design. The circuit design and run information comprise the data generated by the design tool in performing a phase of the design flow. Each phase of the design flow produces different circuit design and run information.

At block 304, the analysis engine selects paths and/or regions to analyze. In each phase of the design flow, the design tool determines the critical paths through static timing analysis. The critical paths are the paths selected by the analysis engine 202 (FIG. 2) for determining violations of design checks.

A region of the target device can be selected by the design tool at block 304 in response to analyzing the circuit design and run information and finding a greater demand for routing resources in the region than there are routing resources available in the region.

At block 306, the design tool identifies violations of design checks in the selected paths and/or regions. Violations can be identified by evaluating the condition of each design check based on the input circuit design run information. For each violation of a design check, the design tool generates a violation object at block 308. Each violation object stores information that identifies the relevant path or regions, information that describes the violated design check, information that indicates the severity (e.g., a score) of the violation, and information that indicates one or more suggested actions for resolving the violation.

Figure 4:
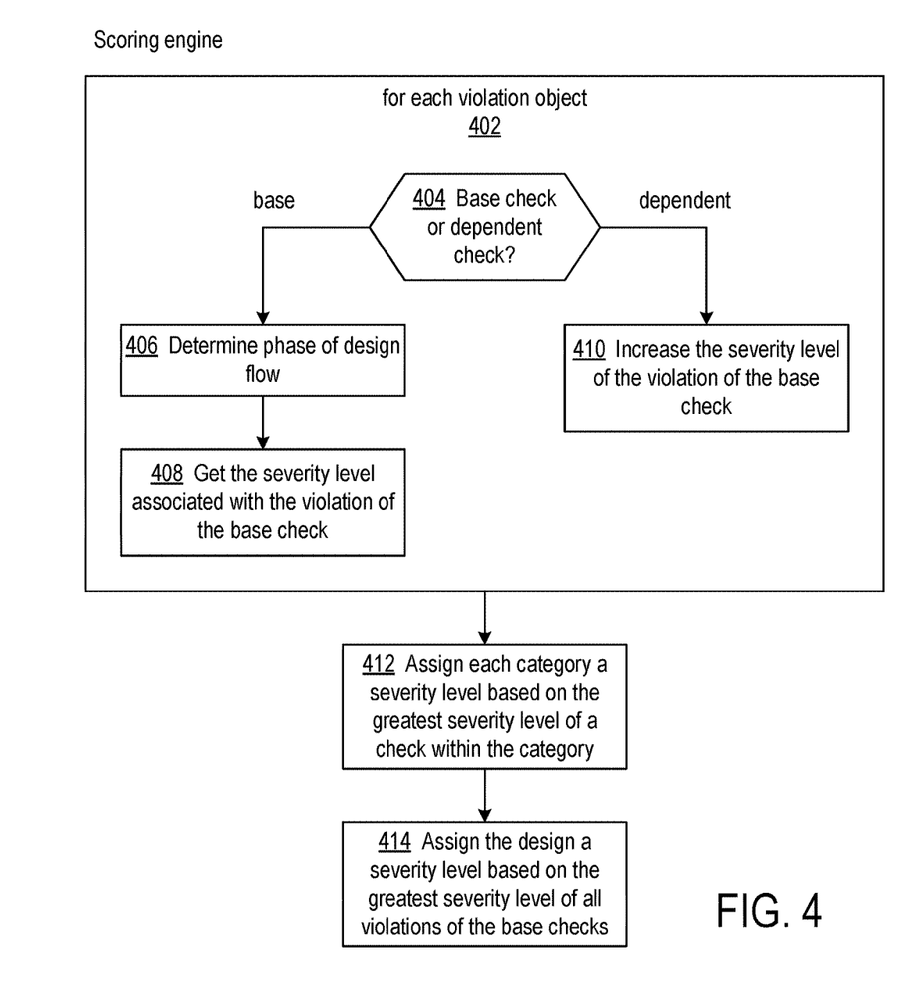
FIG. 4 shows a flowchart of a process performed by the scoring engine

FIG. 4 shows a flowchart of a process performed by the scoring engine 204 (FIG. 2). The scoring engine determines severity levels of the violations and uses the severity levels of the violations to determine satisfaction level of the circuit design. In an exemplary approach, the scoring engine determines scores to quantify severity levels and a satisfaction level.

A design check can be either a "base design check" or a "dependent design check." Each dependent design check depends on one of the base design checks, and a base design check can have multiple dependent design checks. The scoring engine determines a score for the violation of a base design check from an initial score associated with the base design check and violations of the dependent design checks of that base design check. Dependent checks worsen the score (increase the severity level) of the corresponding base design check. For example, if the base design check for the setup WNS after the placement phase has a medium severity level, and there are violations of dependent design checks for the number of nets crossing a super logic region, then the scoring engine increases the severity level of the violation (e.g., decreases the score) of the base design check to severe.

The scoring engine determines a score for each class (utilization, timing, design constraints, congestion and clocking) of the design checks from the base design checks of the classes. The minimum score (the most severe violation) across all base design checks is the score (satisfaction level) for the design.

The scoring engine performs the processing of block 402 for each violation object. At decision block 404, the scoring engine determines whether the violation object indicates a violation of a base design check or a dependent design check.

The relationship between base design checks and dependent design checks can be specified along with the parameter ranges and conditions of the design checks in an XML file. The XML file can indicate for each design check whether the design check is a base design check or a dependent design check. The XML file can specify identifiers for the design checks, and each base design check can have an associated list of identifiers of dependent design checks of that base design check.

As one example, a base design check is identified as "TIMING-1" and has "TIMING-3" as a dependent design check. TIMING-1 is a design check for WNS setup failures. TIMING-3 is a design check for WNS setup failures having macros in critical paths. As another example, "TIMING-2" is a base design check, and "TIMING-17" is a dependent design check of TIMING-2. TIMING-2 is a design check for a worst hold slack (WHS) hold failure, and TIMING-17 is a design check for clock uncertainty.

In response to finding a violation object indicating a violation of a base design check, the scoring engine at block 406 determines the phase of the design flow indicated by the run information 208 (FIG. 2). Based on the phase of the design flow and any relevant metrics in the violation object, the scoring engine at block 408 looks-up the severity level of the violation of the base check in the parameter ranges and conditions information 218 (FIG. 2). The severity level can be indicated by a score as described above.

In response to finding that the violation object indicates a violation of a dependent design check, at block 410 the scoring engine increases the severity level determined for the violation of the base design check. Each dependent design check can have a severity level, and the severity level of the base design check can be increased by an amount that is proportional to the severity level of the dependent design check. In the exemplary approach, the severity level can be increased by decreasing the score of the base design check.

At block 412, the scoring engine assigns a severity level to each class of design check based on the severity levels of the violations of the design checks within each class. For example, the utilization class of design checks is assigned the severity level of the most severe violation of the base design checks in the utilization class, the timing class of design checks is assigned the severity level of the most severe violation of the base design checks in the timing class, etc. The most severe violation can be indicated by the lowest score.

The scoring engine at block 414 determines the satisfaction level of the circuit design based on the severity levels determined for the violations of the classes of design checks. In an exemplary approach, the satisfaction level is determined to be the severity level of the class of design checks having the most severe violation, which is the severity level of the base design check having the most severe violation (lowest score).

Figure 5:
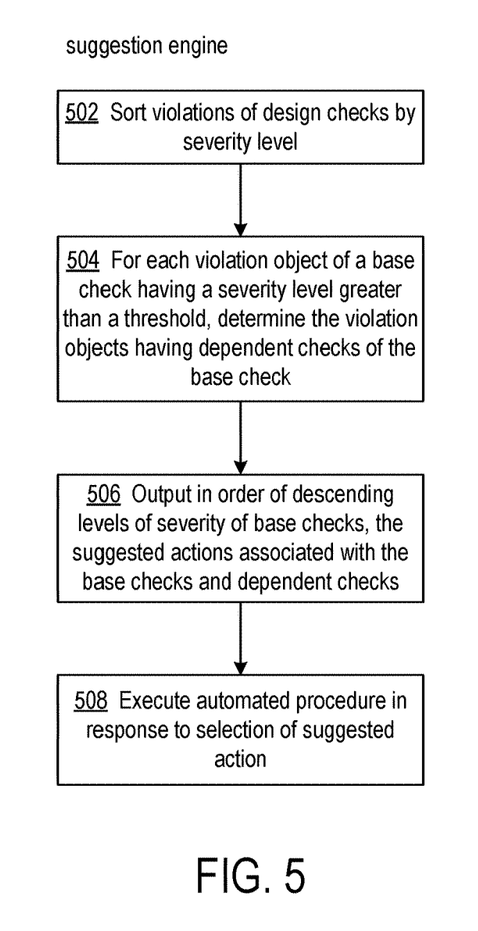
FIG. 5 is a flowchart of a process performed by the suggestion engine.

FIG. 5 is a flowchart of a process performed by the suggestion engine 206 (FIG. 2). At block 502, the suggestion engine sorts the violation objects 216 (FIG. 2) in order of most severe to least severe based on the violation scores 220 (FIG. 2). At block 504, the suggestion engine determines the dependent design check(s) associated with each base design check having a severity level greater than a threshold. In order of most severe violation to least severe violation of the base design checks, the suggestion engine at block 506 outputs the suggested actions associated with the base and dependent design checks. The suggested actions can include manual actions that can be taken by the designer and/or automated procedures that can be initiated by the designer. At block 508, the suggestion engine executes an automated procedure in response to user selection of a display object or a keyed or verbal command.

Figure 6:
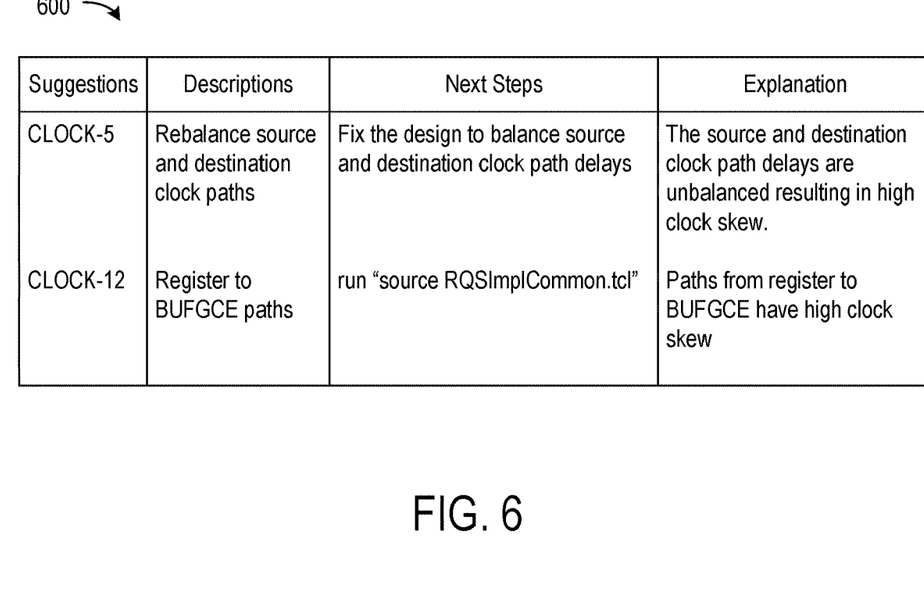
FIG. 6 shows a portion of user interface display in which manual and automated suggested actions are provided as output by the suggestion engine.

FIG. 6 shows a portion of user interface display 600 in which manual an automated suggested actions are provided as output by the suggestion engine 206 (FIG. 2). The suggested actions are for the design checks identified as CLOCK-5 AND CLOCK-12. The text in the "Next Steps" column indicate the actions that the designer can take to resolve the indicated violations. For the violation of the design check CLOCK-12, the automated action is performed by the Tcl script "source RQSImplCommon.tcl." In one approach, the Next Step can be an object that the user can select, and in response to the selection, the referenced script is executed.

Figure 7:
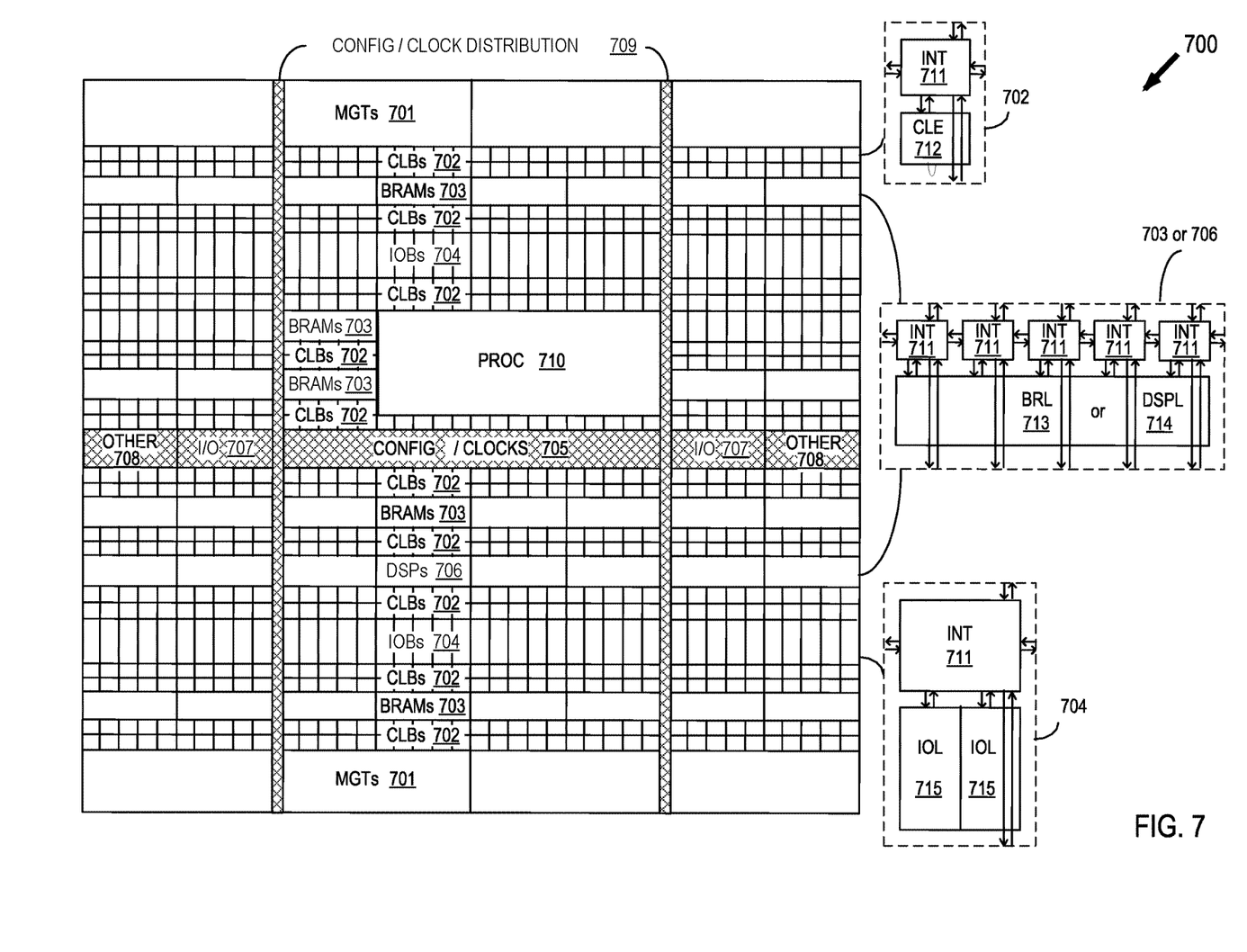
FIG. 7 shows a programmable integrated circuit (IC) on which a circuit design prepared in accordance with the disclosed methods and systems can be implemented.

FIG. 7 shows a programmable integrated circuit (IC) 700 on which a circuit design prepared in accordance with the disclosed methods and systems can be implemented. The programmable IC may also be referred to as a System On Chip (SOC) that includes field programmable gate array (FPGA) logic along with other programmable resources. FPGA logic may include several different types of programmable logic blocks in the array. For example, FIG. 7 illustrates programmable IC 700 that includes a large number of different programmable tiles including multi-gigabit transceivers (MGTs) 701, configurable logic blocks (CLBs) 702, random access memory blocks (BRAMs) 703, input/ output blocks (IOBs) 704, configuration and clocking logic (CONFIG/CLOCKS) 705, digital signal processing blocks (DSPs) 706, specialized input/output blocks (I/O) 707, for example, clock ports, and other programmable logic 708 such as digital clock managers, analog-to-digital converters, system monitoring logic, and so forth. Some programmable ICs having FPGA logic also include dedicated processor blocks (PROC) 710 and internal and external reconfiguration ports (not shown). Circuit designs processed according to the disclosed methods and systems can also be implemented as ASICs or on an adaptive compute acceleration platform (ACAP). An ACAP has FPGA fabric with distributed memory and hardware-programmable DSP blocks, a multicore SoC, and one or more software programmable, yet hardware adaptable, compute engines, all connected through a network on chip (NoC).

In some FPGA logic, each programmable tile includes a programmable interconnect element (INT) 711 having standardized connections to and from a corresponding interconnect element in each adjacent tile. Therefore, the programmable interconnect elements taken together implement the programmable interconnect structure for the illustrated FPGA logic. The programmable interconnect element INT 711 also includes the connections to and from the programmable logic element within the same tile, as shown by the examples included at the top of FIG. 7.

For example, a CLB 702 can include a configurable logic element CLE 712 that can be programmed to implement user logic, plus a single programmable interconnect element INT 711. A BRAM 703 can include a BRAM logic element (BRL) 713 in addition to one or more programmable interconnect elements. Typically, the number of interconnect elements included in a tile depends on the height of the tile. The illustrated BRAM tile has the same height as five CLBs, but other numbers (e.g., four) can also be used. A DSP tile 706 can include a DSP logic element (DSPL) 714 in addition to an appropriate number of programmable interconnect elements. An 10B 704 can include, for example, two instances of an input/output logic element (IOL) 715 in addition to one instance of the programmable interconnect element INT 711. As will be clear to those of skill in the art, the actual I/O bond pads connected, for example, to the I/O logic element 715, are manufactured using metal layered above the various illustrated logic blocks, and typically are not confined to the area of the input/output logic element 715.

A columnar area near the center of the die (shown shaded in FIG. 7) is used for configuration, clock, and other control logic. Horizontal areas 709 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 7 include additional logic blocks that disrupt the regular columnar structure making up a large part of the programmable IC. The additional logic blocks can be programmable blocks and/or dedicated logic. For example, the processor block PROC 710 shown in FIG. 7 spans several columns of CLBs and BRAMs.

Note that FIG. 7 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 7 are purely exemplary. For example, in an actual programmable IC, more than one adjacent column of CLBs is typically included wherever the CLBs appear, to facilitate the efficient implementation of user logic.

Figure 8:
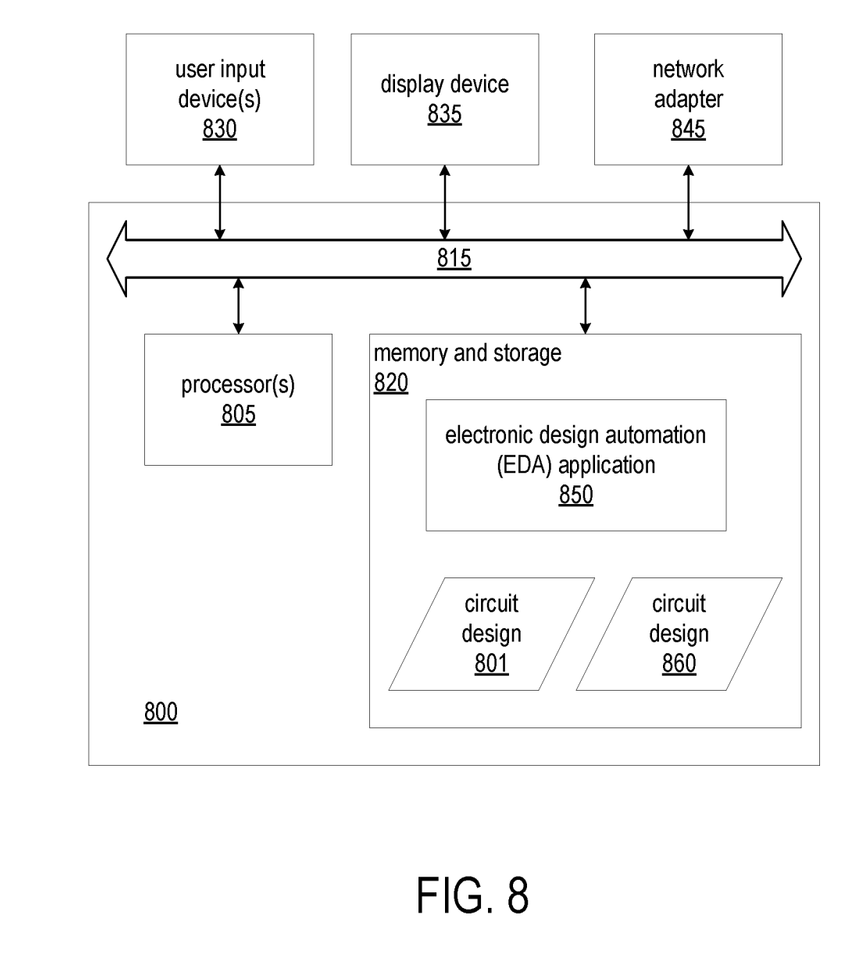
FIG. 8 is a block diagram illustrating an exemplary data processing system.

FIG. 8 is a block diagram illustrating an exemplary data processing system (system) 800. System 800 is an example of an EDA system. As pictured, system 800 includes at least one processor circuit (or "processor"), e.g., a central processing unit (CPU) 805 coupled to memory and storage arrangement 820 through a system bus 815 or other suitable circuitry. System 800 stores program code and circuit design 100 within memory and storage arrangement 820. Processor 805 executes the program code accessed from the memory and storage arrangement 820 via system bus 815. In one aspect, system 800 is implemented as a computer or other data processing system that is suitable for storing and/or executing program code. It should be appreciated, however, that system 800 can be implemented in the form of any system including a processor and memory that is capable of performing the functions described within this disclosure.

Memory and storage arrangement 820 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 800 may also include one or more cache memories (not shown) that provide temporary storage of at least some program code and data in order to reduce the number of times program code and data must be retrieved from local memory and persistent storage during execution.

Input/output (I/O) devices such as user input device(s) 830 and a display device 835 may be optionally coupled to system 800. The I/O devices may be coupled to system 800 either directly or through intervening I/O controllers. A network adapter 845 also can be coupled to system 800 in order to couple system 800 to other systems, computer systems, remote printers, and/or remote storage devices through intervening private or public networks. Modems, cable modems, Ethernet cards, and wireless transceivers are examples of different types of network adapter 845 that can be used with system 800.

Memory and storage arrangement 820 may store an EDA application 850. EDA application 850, being implemented in the form of executable program code, is executed by processor(s) 805. As such, EDA application 850 is considered part of system 800. System 800, while executing EDA application 850, receives and operates on circuit design 801. In one aspect, system 800 performs a design flow on circuit design 801, and the design flow may include synthesis, optimization, mapping, placement, routing, along with the techniques for detecting and resolving violations of design checks as described herein. System 800 generates a modified version of circuit design 801 as circuit design 860.

EDA application 850, circuit design 801, circuit design 860, and any data items used, generated, and/or operated upon by EDA application 850 are functional data structures that impart functionality when employed as part of system 800 or when such elements, including derivations and/or modifications thereof, are loaded into an IC such as a programmable IC causing implementation and/or configuration of a circuit design within the programmable IC.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for processing circuit designs. Other aspects and features will be apparent to those skilled in the art from consideration of the specification. It is intended that the specification and drawings be considered as examples only, with a true scope of the invention being indicated by the following claims.

What is claimed is:

1. A method comprising:
identifying first violations of design checks in a circuit design by a design tool executing on a computer, wherein the first violations indicate characteristics exhibited by the circuit design and that contribute to timing failure, congestion, and exceeding a power constraint;
determining severity levels of the first violations by the design tool;
determining for each violation of the first violations, one or more suggested actions associated with the violation by the design tool;
presenting on a display, first data indicative of the suggested actions in order of the severity levels of the first violations, wherein the first data include one or more first selectable objects, and each first selectable object has an associated executable procedure;
executing by the design tool the procedure associated with one of the first selectable objects in response to selection of the one of the first selectable objects; and
modifying the circuit design in response to the executing of the procedure associated with the one of the first selectable objects.

2. The method of claim 1, further comprising:
synthesizing the circuit design by the design tool;
determining by the design tool after the synthesizing, a first satisfaction level of the circuit design based on the severity levels of the first violations;
performing post-synthesis optimization by the design tool in response to the first satisfaction level being greater than a first threshold; and
wherein the determining the one or more suggested actions and presenting first data are performed in response to the first satisfaction level being less than the first threshold.

3. The method of claim 2, further comprising:
performing by the design tool after performing the post-synthesis optimization, operations including:
identifying second violations of design checks in the circuit design, wherein the second violations indicate characteristics exhibited by the circuit design and that contribute to timing failure, congestion, and exceeding a power constraint;
determining severity levels of the second violations;
determining a second satisfaction level of the circuit design based on the severity levels of the second violations;
performing by the design tool in response to the second satisfaction level being less than a second threshold, operations including:
determining for each violation of the second violations, one or more suggested actions associated with the violation;
presenting on the display, second data indicative of the suggested actions in order of the severity levels of the second violations, wherein the second data include one or more second selectable objects, and each second selectable object has an associated executable procedure;
executing by the design tool the procedure associated with one of the second selectable objects in response to selection of the one of the second selectable objects;
modifying the circuit design by the executing procedure associated with the one of the second selectable objects; and
placing the circuit design by the design tool in response to the second satisfaction level being greater than the second threshold.

4. The method of claim 2, wherein the determining the first satisfaction level includes:
determining a most severe level of the severity levels of the first violations; and
assigning to the first satisfaction level, the most severe level of the severity levels of the first violations.

5. The method of claim 4, wherein:
the design checks include base design checks, each base design check has a pre-assigned severity level, and one or more of the base design checks has an associated set of one or more dependent design checks; and
the determining of the severity levels of the first violations by the design tool includes increasing the severity level of a violation of the first violations from the pre-assigned severity level associated with a base design check in response to violation of a dependent design check associated with the base design check.

6. The method of claim 1, wherein:
the design checks have threshold values of associated parameters, and the parameters are characteristics of the circuit design; and
the identifying of the first violations includes:
determining values of the associated parameters; and
determining that a particular design check of the design checks is violated in response to failure of the determined value of the associated parameter of the particular design check to satisfy the threshold value of the associated parameter.

7. The method of claim 6, wherein:
the particular design check has a plurality of associated ranges of values of the associated parameter, and each range of the associated ranges has an associated severity level; and
the determining of the severity levels includes:
determining a particular range of the plurality of associated ranges that encompasses the determined value of the associated parameter of the particular design check; and
assigning the severity level of the particular range to the particular design check.

8. The method of claim 7, wherein:
the particular design check has a plurality of sets of associated ranges of values of the associated parameter, and each set of the plurality of sets of associated ranges is associated with a design phase of a plurality of design phases including synthesis, optimization, placement, and routing;
the determining of the severity levels includes:
selecting one set of the plurality of sets of associated ranges, the one set associated with a design phase of the plurality of design phases that matches a most recently completed design phase of the plurality of design phases; and determining from the one set, the particular range of the plurality of associated ranges that encompasses the determined value of the associated parameter.

9. The method of claim 1, wherein the identifying of the first violations of design checks includes identifying violations of design checks indicative of resource utilization and routability of the circuit design.

10. The method of claim 1, further comprising:
generating implementation data for making an integrated circuit (IC) from the circuit design; and
making an IC with the implementation data.

11. A system comprising:
a processor;
a memory arrangement coupled to the processor, wherein the memory arrangement is configured with instructions and in response to execution of the instructions, the processor performs operations including:
  identifying first violations of design checks in a circuit design, wherein the first violations indicate characteristics exhibited by the circuit design and that contribute to timing failure, congestion, and exceeding a power constraint;
  determining severity levels of the first violations;
  determining for each violation of the first violations, one or more suggested actions associated with the violation;
  presenting on a display, first data indicative of the suggested actions in order of the severity levels of the first violations, wherein the first data include one or more first selectable objects, and each first selectable object has an associated executable procedure;
  executing the procedure associated with one of the first selectable objects in response to selection of the one of the first selectable objects; and
  modifying the circuit design in response to the executing of the procedure associated with the one of the first selectable objects.

12. The system of claim 11, wherein the memory arrangement is further configured with instructions that when executed by the processor cause the processor to perform operations including:
  synthesizing the circuit design;
  determining after the synthesizing, a first satisfaction level of the circuit design based on the severity levels of the first violations;
  performing post-synthesis optimization in response to the first satisfaction level being greater than a first threshold; and
  wherein the determining the one or more suggested actions and presenting first data are performed in response to the first satisfaction level being less than the first threshold.

13. The system of claim 12, wherein the memory arrangement is further configured with instructions that when executed by the processor cause the processor to perform operations including:
  performing, after performing the post-synthesis optimization, operations including:
    identifying second violations of design checks in the circuit design, wherein the second violations indicate characteristics exhibited by the circuit design and that contribute to timing failure, congestion, and exceeding a power constraint;
    determining severity levels of the second violations;
    determining a second satisfaction level of the circuit design based on the severity levels of the second violations;
    performing in response to the second satisfaction level being less than a second threshold, operations including:
      determining for each violation of the second violations, one or more suggested actions associated with the violation;
      presenting on the display, second data indicative of the suggested actions in order of the severity levels of the second violations, wherein the second data include one or more second selectable objects, and each second selectable object has an associated executable procedure;
      executing the procedure associated with one of the second selectable objects in response to selection of the one of the second selectable objects;
      modifying the circuit design by the executing procedure associated with the one of the second selectable objects; and
    placing the circuit design in response to the second satisfaction level being greater than the second threshold.

14. The system of claim 12, wherein the instructions for determining the first satisfaction level include instructions that when executed by the processor cause the processor to perform operations including:
  determining a most severe level of the severity levels of the first violations; and
  assigning to the first satisfaction level, the most severe level of the severity levels of the first violations.

15. The system of claim 14, wherein:
the design checks include base design checks, each base design check has a pre-assigned severity level, and one or more of the base design checks has an associated set of one or more dependent design checks; and
the instructions for determining of the severity levels of the first violations include instructions that when executed cause the processor to increase the severity level of a violation of the first violations from the pre-assigned severity level associated with a base design check in response to violation of a dependent design check associated with the base design check.

16. The system of claim 11, wherein:
the design checks have threshold values of associated parameters, and the parameters are characteristics of the circuit design; and
the instructions for identifying of the first violations include instructions that when executed cause the processor to perform operations including:
  determining values of the associated parameters; and
  determining that a particular design check of the design checks is violated in response to failure of the determined value of the associated parameter of the particular design check to satisfy the threshold value of the associated parameter.

17. The system of claim 16, wherein:
the particular design check has a plurality of associated ranges of values of the associated parameter, and each range of the associated ranges has an associated severity level; and
the instructions for determining of the severity levels include instructions that when executed cause the processor to perform operations including:
  determining a particular range of the plurality of associated ranges that encompasses the determined value of the associated parameter of the particular design check; and assigning the severity level of the particular range to the particular design check.

18. The system of claim 17, wherein:

the particular design check has a plurality of sets of associated ranges of values of the associated parameter, and each set of the plurality of sets of associated ranges is associated with a design phase of a plurality of design phases including synthesis, optimization, placement, and routing;

the instructions for determining of the severity levels include instructions that when executed cause the processor to perform operations including:

selecting one set of the plurality of sets of associated ranges, the one set associated with a design phase of the plurality of design phases that matches a most recently completed design phase of the plurality of design phases; and determining from the one set, the particular range of the plurality of associated ranges that encompasses the determined value of the associated parameter.

19. The system of claim 11, wherein the memory arrangement is further configured with instructions that when executed by the processor cause the processor to perform operations including:

generating implementation data for making an integrated circuit (IC) from the circuit design; and making an IC with the implementation data.

* * * * *